(12) United States Patent
Iwamura

(10) Patent No.: US 7,876,717 B2
(45) Date of Patent: Jan. 25, 2011

(54) SYSTEM AND METHOD FOR PROVIDING ACCESS IN POWERLINE COMMUNICATIONS (PLC) NETWORK

(75) Inventor: Ryuichi Iwamura, San Diego, CA (US)

(73) Assignees: Sony Corporation, Tokyo (JP); Sony Electronics Inc., ParkeRidge, NJ (US)

(*) Notice: Subject to any disclaimer, the term of this patent is extended or adjusted under 35 U.S.C. 154(b) by 685 days.

(21) Appl. No.: 11/297,877

(22) Filed: Dec. 9, 2005

(65) Prior Publication Data
US 2007/0135085 A1 Jun. 14, 2007

(51) Int. Cl.
H04J 1/00 (2006.01)
H04J 3/16 (2006.01)
H04J 4/00 (2006.01)
H04L 5/14 (2006.01)
H04L 12/42 (2006.01)
H04L 12/43 (2006.01)
H04B 7/00 (2006.01)
H04W 4/00 (2009.01)

(52) U.S. Cl. .................. 370/281; 370/295; 370/310.2; 370/329; 370/341; 370/346; 370/436; 370/437; 370/449; 370/459

(58) Field of Classification Search .......... 340/310.01–340.03; 370/329, 341, 346, 431, 370/437, 442, 449, 459
See application file for complete search history.

(56) References Cited

U.S. PATENT DOCUMENTS

| | | | |
|---|---|---|---|
| 4,200,862 A * | 4/1980 | Campbell et al. ...... | 340/310.11 |
| 5,600,707 A * | 2/1997 | Miller, II ............... | 370/281 |
| 5,812,557 A | 9/1998 | Stewart et al. ............. | 371/20.1 |
| 6,141,351 A * | 10/2000 | Goodnow et al. .......... | 370/449 |
| 6,185,423 B1 * | 2/2001 | Brown et al. .............. | 455/434 |
| 6,236,371 B1 * | 5/2001 | Beck ......................... | 343/703 |
| 6,341,158 B1 * | 1/2002 | Corso et al. .............. | 379/15.01 |
| 6,459,692 B1 | 10/2002 | Ben-Michael et al. ...... | 370/341 |
| 6,680,979 B2 | 1/2004 | Kato et al. ................. | 375/260 |
| 7,046,882 B2 * | 5/2006 | Kline ......................... | 385/100 |
| 7,158,013 B2 * | 1/2007 | Schwager et al. .......... | 370/478 |
| 2001/0028678 A1 | 10/2001 | Kato et al. ................. | 375/222 |
| 2003/0023732 A1 | 1/2003 | Cohen ....................... | 709/229 |
| 2003/0038710 A1 * | 2/2003 | Manis et al. ........... | 340/310.01 |
| 2003/0137986 A1 | 7/2003 | Kaku et al. ................. | 370/449 |
| 2004/0075535 A1 | 4/2004 | Propp et al. ........... | 340/310.01 |
| 2004/0174851 A1 * | 9/2004 | Zalitzky et al. ............ | 370/338 |
| 2004/0208139 A1 | 10/2004 | Iwamura .................... | 370/321 |
| 2004/0218688 A1 | 11/2004 | Santhoff et al. ............ | 375/295 |
| 2004/0243684 A1 | 12/2004 | Ha et al. .................... | 709/208 |
| 2004/0249903 A1 | 12/2004 | Ha et al. .................... | 709/208 |
| 2004/0261101 A1 | 12/2004 | Iwamura .................... | 725/32 |

(Continued)

OTHER PUBLICATIONS

Practical problems of using the distribution lines for Automatic Meter Reading, Gray, Sep. 1999.*
"Powerline Telecommunications (PLT); Coexistence of Access and In-House Powerline Systems" ETSI TS 101 867 V1.1.1 (Nov. 2002).

Primary Examiner—Daniel J Ryman
Assistant Examiner—Nishant B Divecha
(74) Attorney, Agent, or Firm—John L. Rogitz

(57) ABSTRACT

To facilitate simultaneous PLC communication using first and second PLC protocols that are different from each other, frequency bands are dynamically assigned on demand to first and second PLC home networks that use the respective first and second PLC protocols.

10 Claims, 3 Drawing Sheets

Powerline Network

U.S. PATENT DOCUMENTS

| | | | |
|---|---|---|---|
| 2005/0185629 A1 | 8/2005 | Kuroda et al. | 370/347 |
| 2005/0190785 A1 | 9/2005 | Yonge, III et al. | 370/465 |
| 2006/0041680 A1* | 2/2006 | Proctor, Jr. et al. | 709/238 |
| 2007/0025386 A1* | 2/2007 | Riedel et al. | 370/445 |

* cited by examiner

Figure 1  Powerline Network

Algorithm for FB Selection

SYSTEM AND METHOD FOR PROVIDING ACCESS IN POWERLINE COMMUNICATIONS (PLC) NETWORK

FIELD OF THE INVENTION

The present invention relates generally to home network systems.

BACKGROUND OF THE INVENTION

Home network systems have been provided that can include a set-top box media server that communicates with various components in the home, e.g., TVs, laptop computers, and custom display devices. To establish network communication paths, power line communication (PLC) networks have been introduced and have gained in popularity owing to the fact that the home's existing AC power grid is used to also carry entertainment data between various components in the home network system which are plugged into AC wall sockets. In this way, no new wiring is required, rendering most home power grids into effective network backbones.

The present invention makes the following critical observation. Several PLC technologies have been introduced, and in general cannot coexist with each other in the same neighborhood. For example, if a user uses PLC adapters that employ regular orthogonal frequency division multiplexing (OFDM) and his neighbor uses PLC adapters that employ wavelet OFDM technology, a conflict occurs and both could interfere each other.

A document titled "ETSI Technical Specification 101 867" proposes to resolve the conflict problem by assigning fixed, static bandwidths for each PLC technology, but as understood herein this is an inefficient solution. Specifically and supposing for illustration that two PLC technologies are accounted for with each being assigned one-half of the total PLC bandwidth, when one system is not being used the other system nonetheless can exploit only one half of the PLC bandwidth, even though the other half is not used. A more flexible, efficient approach is provided herein.

SUMMARY OF THE INVENTION

A method for facilitating simultaneous PLC communication using first and second PLC protocols that are different from each other includes dynamically assigning frequency bands on demand to first and second PLC home networks which respectively use the first and second PLC protocols.

In non-limiting implementations the method includes monitoring a frequency spectrum to identify unused bands in the spectrum. Frequency band test tones can be sent from a transmitter in a PLC network to a receiver in the PLC network to determine whether a frequency band associated with tone is acceptable. A frequency band can be deemed to be acceptable if the tone check indicates at least a threshold bandwidth. Test tones may be sent only on bands in the spectrum determined to be currently available. If desired, the method may include determining, in response to determining that a frequency is acceptable, whether the frequency band determined to be acceptable has sufficient bandwidth for an intended communication, and if not testing an additional band in the spectrum for acceptability.

The highest available band in the spectrum preferably is tested first for acceptability. The method can include monitoring bands in the spectrum for a monitoring period to determine which bands are unused.

In another aspect, a network that may be, e.g., a PLC network includes a transmitting device and a receiving device to receive information from the transmitting device. The transmitting device and receiving device exchange test tone information to facilitate dynamic assignation of at least one band in a spectrum over which the information is subsequently sent from the transmitting device to the receiving device.

In yet another aspect, a network such as a PLC network includes a transmitting device and a receiving device to receive information from the transmitting device. In response to a signal for the transmitting device to send information to the receiving device, a network component dynamically identifies at least one frequency band in a spectrum that is available for use, with the information being sent over the at least one frequency band that is available for use.

BRIEF DESCRIPTION OF THE DRAWINGS

The details of the present invention, both as to its structure and operation, can best be understood in reference to the accompanying drawings, in which like reference numerals refer to like parts, and in which.

DETAILED DESCRIPTION OF THE PREFERRED EMBODIMENTS

Figure 1:
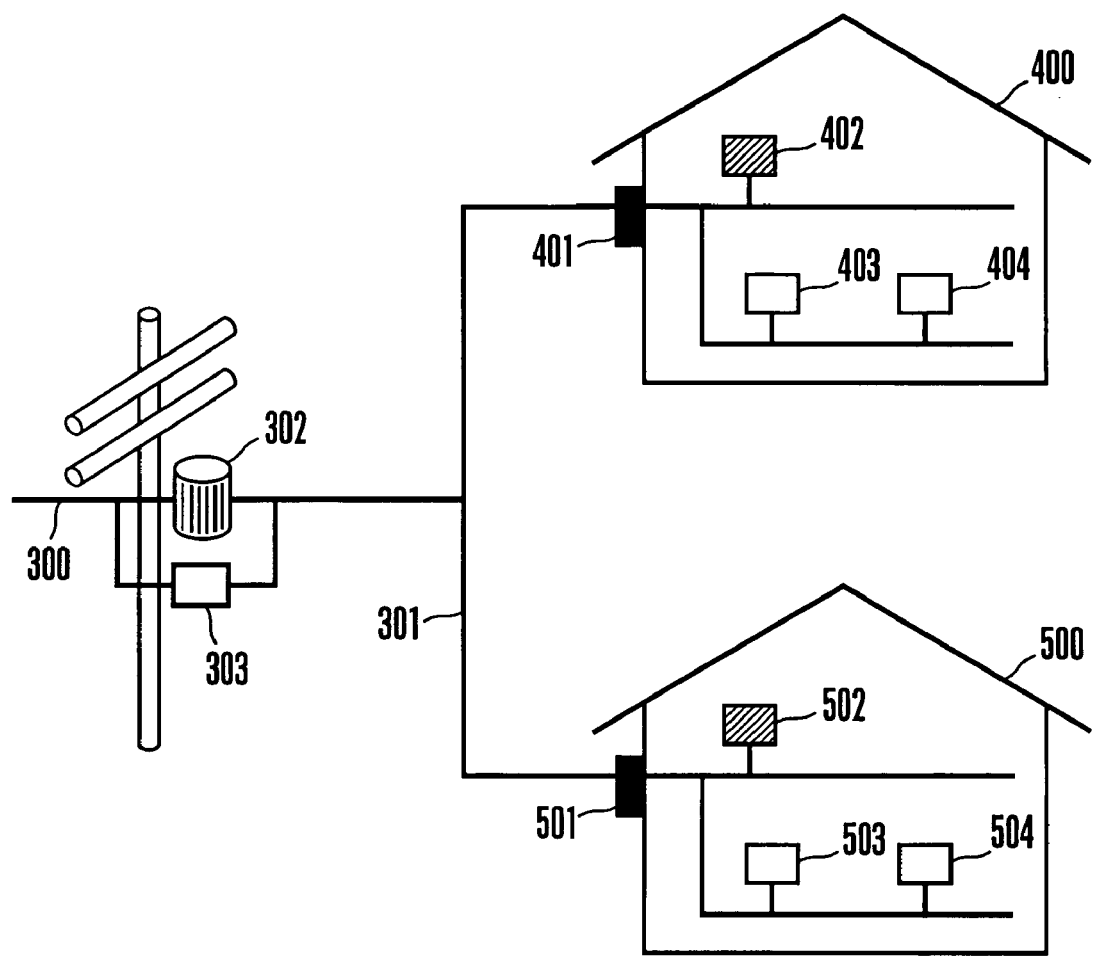
FIG. 1 is a block diagram of two non-limiting home network systems.

Referring initially to FIG. 1, a home network system is shown to illustrate an environment in which the present invention can be used. Two homes 400, 500 are shown, each with its own PLC network. For illustration it is assumed that the two PLC networks use different technologies. As shown, each PLC network includes a respective switchboard 401 (501) that communicates, over the electrical lines of the home in accordance with PLC principles, with a respective master device 402 (502) for the in-home logical network. Plural client devices 403 (503) and 404 (504) are also connected to the respective powerline network. For example, in non-limiting embodiments the client devices 403, 503 can be PLC network servers that transmit information such as but not limited to entertainment information to the client devices 404, 504, which can be TVs.

A distribution transformer 302 supplies electricity to the homes 400 and 500. Because of significant signal attenuation at the transformer 302, a repeater 303 is typically provided to relay PLC signals between the main low voltage (LV) power line 300 and the local power line 301.

The repeater 303 and devices 402, 403, 404, 502, 503, 504 may include respective processors. The logic below may be implemented by one or more of the processors.

Figure 2:
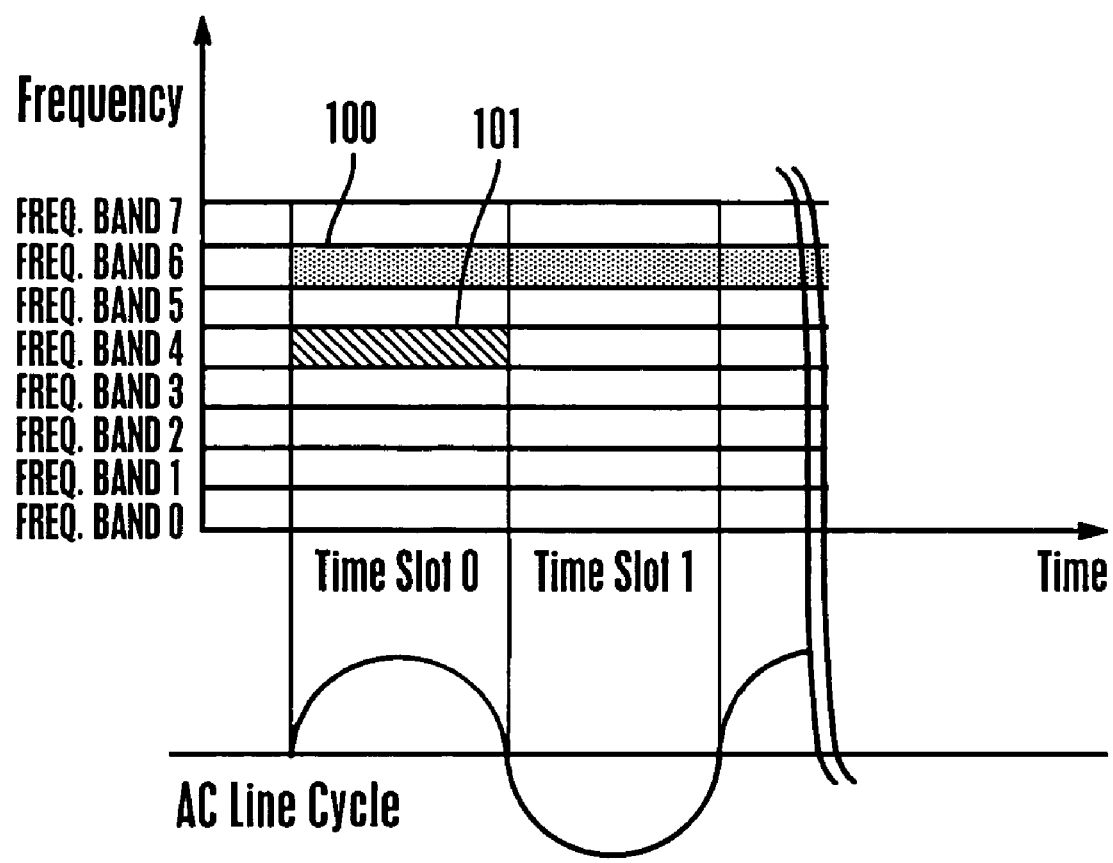
FIG. 2 is a schematic diagram of a PLC frequency spectrum.
Figure 3:
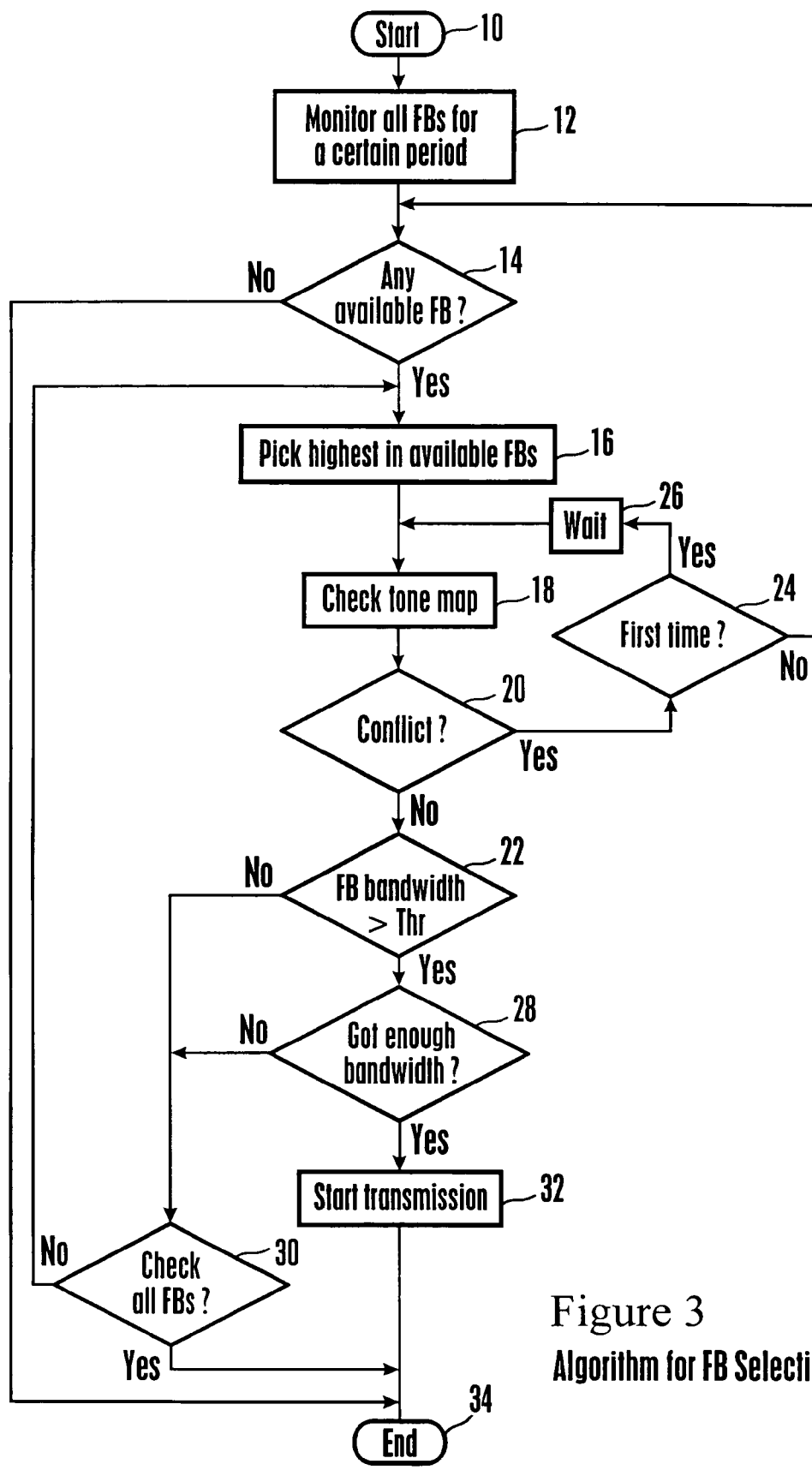
FIG. 3 is a flow chart of a non-limiting implementation of the present logic.

To illustrate an example PLC network spectrum that can be used in conjunction with the logic explained further below, FIG. 2 shows a spectrum that may be, e.g., one to thirty MHz and that is divided into, e.g., eight frequency bands (FB), denoted (FB) 0-7. Each FB has a bandwidth of 3.625 MHz. In one non-limiting implementation, the master devices 402, 502 and the repeater 303 negotiate bandwidth assignment using FB 0.

When a frequency band is requested and assigned in accordance with the disclosure below, the OFDM sub-carriers in the FB are turned on and all the other sub-carriers are turned off (unless they too are currently in use). A time slot is established at zero cross points of the AC line cycle, usually 50 or 60 Hz. Each PLC communication is performed in an access block unit that is divided by a frequency band and a time slot in accordance with the below-described logic. If the communication is short, a transmitter device may use only a single time slot, e.g., time slot 101 in FIG. 2, before releasing the frequency band. In contrast, for longer communications or for isochronous streaming, a transmitter device uses plural sequential time slots (e.g., the slots 100) in the assigned frequency until the transmission terminates and the FB consequently is released.

Accordingly, because each access block is completely separated and independent from those of a neighboring band of the spectrum, different PLC technologies can coexist and share the powerline network spectrum without any conflict. In the example above, the device 403 can send a video stream to the device 404 within FB6 using PLC technology "X", while at the same time, in the neighbor home, the device 503 can send entertainment data to the device 504 using PLC technology "Y", with the two streams being separated with frequency bands and time slots. Each access block is dynamically assigned on demand, so the network bandwidth is efficiently used.

Now referring to one non-limiting way to dynamically assign access blocks, i.e., to assign access blocks as needed in response to desired transmission of data over a PLC network, the process starts at state 10 and proceeds to block 12, wherein the device seeking to transmit data over a PLC network to a receiver monitors all FBs in the spectrum for a certain period, for example, three AC line cycles. In other implementations a record of FB usage can be shared among the repeater 303 and master devices 402, 502 so that it is known which FBs currently are in use.

Proceeding to decision diamond 14, it is determined whether any available FBs in the spectrum are available. In non-limiting implementations the master devices 402, 502 and the repeater 303 maintain identical FB usage tables, updating each other with usage information, so that the tables can be used in the determination at decision diamond 14. If an available FB exists, the logic proceeds to block 16 to select, from among the available FBs, the FB with the highest frequency. This highest frequency preferably is selected to preserve lower frequencies for prospective long-range communication.

Moving to block 18, a tone map can be exchanged with the receiver device using the selected FB. If desired, during this exchange the logic can loop to decision diamond 20 to determine whether a conflict has just arisen in the form of the FB being concurrently assigned to another device during the tone map exchange. If no conflict has emerged, the process moves to decision diamond 22 to determine whether, based on the tone map exchange, the bandwidth meets a threshold bandwidth.

The tone map exchange can be undertaken using a few access blocks. In one non-limiting implementation, the device seeking to transmit sends a test tone for each OFDM sub-carrier in the FB to the intended receiver. The intended receiver returns a carrier/noise ratio for each sub-carrier. Similarly, if desired the intended receiver can send a test tone to the intended transmitter, which expects a response from the receiver. The intended transmitter device estimates the actual bandwidth of the FB based on the result of this exchange. In this way, it can be determined whether the frequency band is acceptable.

As mentioned above, if desired it can be determined at decision diamond 20 whether any conflicts in use of the selected FB have arisen, and if a conflict exists, the logic can move from decision diamond 20 to decision diamond 24 to determine whether this is the first time a conflict has been observed for the selected FB in the current transmission test cycle. If so, the process can wait for a period, which may be of fixed or random length, at block 26 and then loop back to block 18 to attempt a tone map exchange again. In contrast, if this is the second conflict, the process returns to decision diamond 14 to select another FB.

When no conflict exists and the bandwidth of the FB under test meets the threshold, the logic moves from decision diamond 22 to decision diamond 28 to determine whether the selected FB is sufficient for the intended communication. If it is, the intended transmitter starts transmission at block 32, ending at state 34 at the termination thereof.

On the other hand, if the bandwidth of the FB is not sufficient to meet the requirements of the transmission at decision diamond 28 or if the FB bandwidth did not meet the threshold at decision diamond 22, the logic proceeds to decision diamond 30, wherein it is determined whether all available FBs have been tested. If so, the process ends, but otherwise the logic loops back to block 16 to select another FB. As transmissions start and stop, the usage tables among the master devices and repeater are updated.

In case of Internet communication, an in-home device can communicate with the repeater 303. Assume the user connects the device 403 to the Internet. The device 403 exchanges a tone map with the repeater 303 using, e.g., FB0. The device 403 obtains an available FB from the master 402 as described before, and then starts communications with the repeater 303. The repeater 303 relays access signal from/to the next higher level repeater.

In the event that another transmitter is far away from the above-mentioned prospective transmitter, the prospective transmitter may not be able to detect any signal from the distant device. However, the prospective receiver may be able to hear both transmitters. In such a "hidden node" case, the receiver cannot respond to the tone map request from the prospective transmitter because a conflict occurs with the distant device. To solve this issue, when the prospective transmitter does not get any response from the receiver after a certain time period, the prospective transmitter relinquishes the FB and attempts a tone map exchange on another FB. In this case, a lower FB is used because lower frequencies have longer range.

It is to be understood that shorter or longer time slots from the one mentioned above may be used, e.g., a full, quarter cycle or ⅛ cycle may define a time slot. Also, a narrower or wider FB may be used than the example described above. Moreover, recognizing that some amateur ham bands need to be notched, FBs do not have to be consecutive. The invention may be applied to other wired or wireless networks in which, for instance, a beacon signal may be required instead of AC line cycle.

With the above disclosure in mind, the skilled artisan will appreciate that the present invention possesses one or more of the following advantages. Different PLC technologies can share the same power line without any conflict. The invention in implementation requires only small modifications, e.g., sub-carrier on/off, AC zero cross detection. OFDM, its variations and other modulations can coexist with each other. By dynamically assigning access blocks, network bandwidth is efficiently used. The invention in preferred implementations can provide simple CSMA-like access that is not centralized, and no complicated bandwidth managing is required. The different PLC technologies do not have to communicate each other for coexistence.

While the particular SYSTEM AND METHOD FOR PROVIDING ACCESS IN POWERLINE COMMUNICATIONS (PLC) NETWORK as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for".

I claim:

1. A method for facilitating simultaneous Power Line Communication (PLC) communication using first and second PLC protocols that are different from each other, comprising:
   dynamically assigning frequency bands on demand to first and second PLC home networks using the respective first and second PLC protocols;
   assigning a first frequency band to a receiver in the first PLC home network, wherein the receiver can communicate with both a first and a second transmitter;
   determining whether the first transmitter in the first PLC home network is too distant from the second transmitter in the first PLC home network to communicate therewith;
   determining whether the receiver can respond to a tone map request from the first transmitter;
   in response to determining that:
      the first transmitter in the first PLC home network is too distant from the second transmitter in the first PLC home network and
      the receiver cannot respond to the tone map request from the first transmitter because a conflict occurs with the second transmitter, and
   further responsive to a determination that the first transmitter fails to receive a response from the receiver after a predetermined time period,
   the fist transmitter relinquishing the first frequency band and attempting a tone map exchange with the receiver on a second frequency band, the second frequency band having a lower frequency than the first frequency band that was attempted to be used by the first transmitter, the second frequency band including at least first and second sub-bands that are not consecutive in a frequency spectrum such that a portion of the frequency spectrum between the first and second sub-bands is notched.

2. The method of claim 1 comprising sending test tones only on bands in the frequency spectrum determined to be currently available.

3. The method of claim 1 further comprising monitoring bands in the frequency spectrum for a monitoring period to determine which bands are unused.

4. The method of claim 1, further comprising:
   monitoring the frequency spectrum to identify unused bands in the frequency spectrum; and
   performing a test tone check by sending at least one frequency band test tone from the at least one transmitter in a PLC network to the at least one receiver in the PLC network to determine whether a frequency band associated with the at least one frequency band test tone is acceptable, wherein the frequency band is acceptable if the tone check indicates at least a threshold bandwidth.

5. The method of claim 4 further comprising determining, in response to determining that a frequency is acceptable, whether the frequency band determined to be acceptable has sufficient bandwidth for an intended communication, and if not testing an additional band in the frequency spectrum for acceptability.

6. A network comprising:
   at least one transmitting device;
   at least one receiving device to receive information from the at least one transmitting device via power line communication (PLC); and
   a network component to dramatically identify at least one frequency band in a spectrum that is available for use, in response to receiving a signal for the at least one transmitting device to send information to the at least one receiving device over a home network;
   wherein the at least one transmitting device sends information over the at least one frequency band that is available for use, the frequency band that is available for use being a first frequency band,
   wherein the network component determines whether any conflicts in use of the first frequency band has arisen, and responsive to a determination that a conflict exists, determines whether the conflict is observed for a first time for the first frequency band, and responsive to determining that the conflict is observed for the first time for the first frequency band, attempts a tone exchange using the first frequency band; and
   wherein the network component attempts to exchange a tone over a second frequency band different from the first frequency band, the second frequency band including at least first and second sub-bands that are not consecutive in the spectrum such that a portion of the spectrum between the first and second sub-bands is notched, in response to determination that the conflict is not observed for the first time for the first frequency band.

7. The network of claim 6, wherein the network component is a master device communicating with the network.

8. The network of claim 6, wherein the at least one transmitting device and the at least one receiving device exchange test tone information to facilitate dynamic assignation of at least one band in the spectrum over which the information is subsequently sent from the at least one transmitting device to the at least one receiving device.

9. The network of claim 8, wherein test tones are sent only on bands in the spectrum determined to be currently available.

10. The network of claim 6, wherein time slots are established at zero cross points of AC line cycle on the network, with communication between the at least one transmitting device and the at least one receiving device being performed in an access block unit that is associated with the frequency band and the time slot such that each of the access block is completely separated and independent from an access blocks of a neighboring band such that two PLC communication steams in the network are separated from each other by both frequency bands and time slots.

* * * * *